(12) United States Patent
Frydman et al.

(10) Patent No.: US 7,892,324 B2
(45) Date of Patent: Feb. 22, 2011

(54) SYSTEMS AND METHODS FOR CARBON DIOXIDE CAPTURE

(75) Inventors: Arnaldo Frydman, Houston, TX (US);
Pradeep Thacker, Bellaire, TX (US);
Sachin Naphad, Houston, TX (US);
Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 11/870,235

(22) Filed: Oct. 10, 2007

(65) Prior Publication Data
US 2009/0095155 A1    Apr. 16, 2009

(51) Int. Cl.
*B01D 53/14* (2006.01)

(52) U.S. Cl. .......................... 95/163; 95/172; 95/207; 95/208; 95/160; 95/235; 95/236; 95/234

(58) Field of Classification Search ................ 95/156, 95/134, 172, 134.1, 72, 232, 235, 236, 160, 95/163, 164; 422/171, 129, 168, 187; 96/234; 60/39.12; 423/237–238
See application file for complete search history.

(56) References Cited

U.S. PATENT DOCUMENTS

| | | | |
|---|---|---|---|
| 3,664,091 A | 5/1972 | Hegwer | |
| 4,552,572 A | 11/1985 | Galstaun | |
| 4,568,364 A | 2/1986 | Galstaun et al. | |
| 4,589,896 A * | 5/1986 | Chen et al. | 92/28 |
| 4,678,648 A | 7/1987 | Wynn | |
| 4,842,615 A * | 6/1989 | Meyer et al. | 44/280 |
| 5,820,837 A | 10/1998 | Marjanovich et al. | |
| 6,090,356 A | 7/2000 | Jahnke et al. | |
| 7,192,468 B2 | 3/2007 | Mak et al. | |
| 7,381,389 B2 * | 6/2008 | Harada et al. | 423/237 |
| 7,674,325 B2 * | 3/2010 | Won | 96/234 |
| 2003/0083390 A1 * | 5/2003 | Shah et al. | 518/702 |
| 2005/0172807 A1 * | 8/2005 | Mak | 95/235 |
| 2007/0095046 A1 * | 5/2007 | Wallace | 60/39.12 |
| 2009/0074643 A1 * | 3/2009 | Pedersen et al. | 423/236 |
| 2009/0092524 A1 * | 4/2009 | Ravikumar et al. | 422/171 |
| 2009/0285738 A1 * | 11/2009 | Winter et al. | 423/224 |
| 2010/0111784 A1 * | 5/2010 | Mak et al. | 422/190 |

* cited by examiner

*Primary Examiner*—Duane Smith
*Assistant Examiner*—Ives Wu
(74) *Attorney, Agent, or Firm*—Armstrong Teasdale LLP

(57) ABSTRACT

Methods and systems for handling sour carbon dioxide ($CO_2$) streams are provided. In one aspect, a method for sequestering an emissions-heavy gas includes removing at least a portion of an acid gas from a rich solvent in an acid gas stripper to create the emissions-heavy gas, and channeling the emissions-heavy gas to a storage system.

20 Claims, 3 Drawing Sheets

SYSTEMS AND METHODS FOR CARBON DIOXIDE CAPTURE

BACKGROUND OF THE INVENTION

This invention relates generally to gasification systems and, more particularly, to systems and methods for capturing a rich carbon dioxide ($CO_2$) stream produced by gasification systems.

At least some known gasification systems, such as those used in power plants, are integrated with at least one power-producing turbine system, thereby forming an integrated gasification combined-cycle (IGCC) power generation system. For example, at least some known gasification systems convert a mixture of fuel, air or oxygen ($O_2$), steam, and/or carbon dioxide ($CO_2$) into a synthetic gas, or "syngas." The syngas is channeled to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification systems associated with IGCC systems initially produce a "raw" syngas fuel includes carbon monoxide (CO), hydrogen ($H_2$), hydrogen sulfide ($H_2S$), and/or carbon dioxide ($CO_2$). Hydrogen sulfide is commonly referred to as an acid gas. Acid gases are generally removed from the raw syngas fuel to produce a "clean" syngas fuel used for combustion within the gas turbine engines. At least some known acid gas removal is performed with an acid gas removal subsystem that includes at least one main absorber that removes a majority of the $H_2S$.

At least some known gasification systems also include at least one sulfur recovery unit (SRU) that recovers sulfur from the acid gas. Tail gas produced by the SRU is compressed and/or recycled to a gasification reactor using a tail gas unit (TGU). However, such a sulfur recovery system, including the SRU and TGU, represents a significant portion of the capital cost of an IGCC system. Moreover, when an IGCC power plant incorporates pre-combustion $CO_2$ separation and purification systems, a significant additional capital cost is incurred.

BRIEF DESCRIPTION OF THE INVENTION

In one aspect, a method for sequestering an emissions-heavy gas includes removing at least a portion of an acid gas from a rich solvent in an acid gas stripper to create the emissions-heavy gas, and channeling the emissions-heavy gas to a storage system.

In another aspect, a method for removing carbon dioxide ($CO_2$) from gases produced by a power system is provided. The method includes removing at least a portion of an acid gas from a rich solvent in an acid gas stripper to create a $CO_2$ stream, pressurizing at least a portion of the $CO_2$ stream, and channeling the pressurized $CO_2$ stream to one of a saline aquifer and an enhanced oil recovery field.

In another aspect, a gas treatment system for use with a power system is provided. The gas treatment system includes an acid gas stripper configured to remove at least a portion of an acid gas from a rich solvent to create a $CO_2$ stream. The gas treatment system also includes a compressor coupled in flow communication downstream from the acid gas stripper, wherein the compressor is configured to pressurize the $CO_2$ stream. The gas treatment system also includes a carbon dioxide ($CO_2$) sequestration system coupled in flow communication downstream from the compressor, wherein the compressor is further configured to channel at least a portion of the pressurized $CO_2$ stream to the $CO_2$ sequestration system.

DETAILED DESCRIPTION OF THE INVENTION

As used herein, the term "lean" is used to describe a solvent that is substantially emissions free, and the term "rich" is used to describe a solvent containing emissions. Similarly, the term "emissions-heavy" is used to describe a gas that contains emissions.

Figure 1:
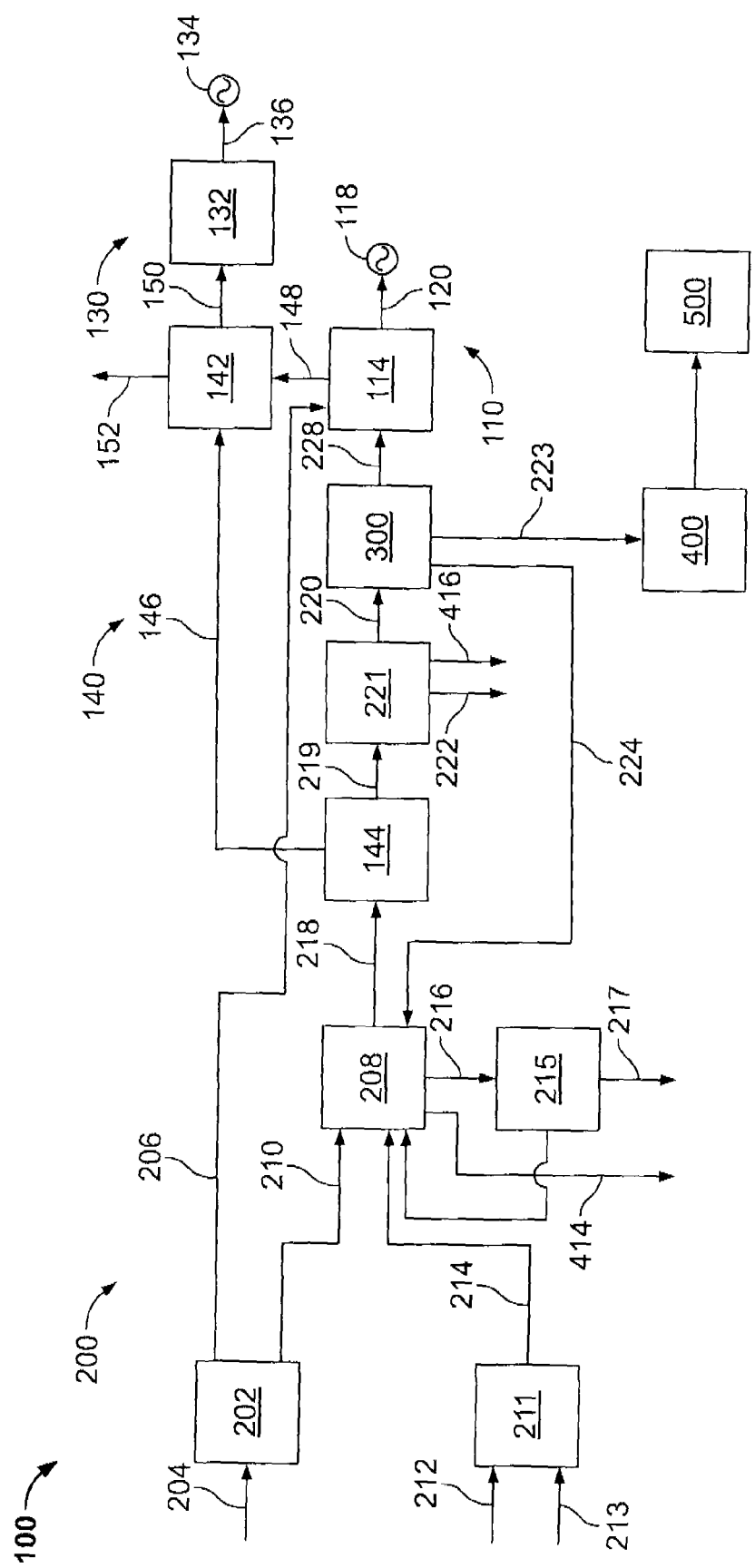
FIG. 1 is a schematic diagram of an exemplary integrated gasification combined-cycle (IGCC) power system.

FIG. 1 is a schematic diagram of an exemplary integrated gasification combined-cycle (IGCC) power generation system 100, such as those used in power plants. In the exemplary embodiment, IGCC system includes a gas turbine engine 110. Turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source, respectively. Turbine 114 produces rotational energy that is transmitted to generator 118 via rotor 120, wherein generator 118 converts the rotational energy to electrical energy for transmission to at least one load, including, but not limited to, an electrical power grid (not shown).

IGCC system 100 also includes a steam turbine engine 130. In the exemplary embodiment, engine 130 includes a steam turbine 132 that is rotatably coupled to a second electrical generator 134 via a second rotor 136.

IGCC system 100 also includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 receives boiler feedwater (not shown) from apparatus 144 via conduit 146 for heating the boiler feedwater into steam. HRSG 142 also receives exhaust gases (not shown) from turbine 114 via an exhaust gas conduit (not shown) that also heats the boiler feedwater into steam. HRSG 142 is coupled in flow communication with turbine 132 via a steam conduit 150. Excess gasses and steam are exhausted from HRSG 142 to the atmosphere via stack gas conduit 152.

Steam conduit 150 channels steam from HRSG 142 to turbine 132. Turbine 132 receives the steam from HRSG 142 and converts the thermal energy in the steam to rotational energy. The rotational energy is transmitted to generator 134 via rotor 136, wherein generator 134 converts the rotational energy to electrical energy for transmission to at least one load, including, but not limited to, an electrical power grid.

IGCC system 100 also includes a gasification system 200. In the exemplary embodiment, system 200 includes at least one air separation unit 202 that is coupled in flow communication with an air source via an air conduit 204. In the exemplary embodiment, such air sources include, but are not limited to only including, dedicated air compressors and/or compressed air storage units (neither shown). Air separation unit 202 separates air into oxygen ($O_2$), nitrogen ($N_2$) and other components that are released via a vent (not shown). The nitrogen is channeled to gas turbine 114 to facilitate combustion.

System 200 includes a gasification reactor 208 that is coupled in flow communication with air separation unit 202 to receive the $O_2$ channeled from unit 202 via a conduit 210. System 200 also includes a coal grinding and preparation unit 211. Unit 211 is coupled in flow communication with a coal source and a water source (neither shown) via a coal supply conduit 212 and a water supply conduit 213, respectively. In an alternative embodiment, the water supply and water supply conduit 213 are not present. Unit 211 may be configured to handle dry or moist feed system and/or to mix coal and water together to form a coal slurry stream (not shown) that is channeled to gasification reactor 208 via a conduit 214.

Gasification reactor 208 receives the coal slurry stream and an oxygen stream via conduits 214 and 210, respectively. Gasification reactor 208 facilitates the production of a hot, raw synthetic gas (syngas) stream. Moreover, gasification reactor 208 also produces a hot slag stream as a by-product of the syngas production. The slag stream is channeled to a slag handling unit 215 via a hot slag conduit 216. Slag handling unit 215 quenches and breaks up the slag into smaller pieces that form a stream that may be removed and channeled through slag conduit 217. In an alternative embodiment, unit 215 recovers soot from solids to facilitate improving gasifier efficiency. The recovered soot returns to gasifier 208 through a conduit (not shown) and substantially soot-free slag is disposed through conduit 217.

Gasification reactor 208 is coupled in flow communication with heat transfer apparatus 144 via a hot syngas conduit 218. Heat transfer apparatus 144 receives the hot, raw syngas stream and transfers at least a portion of its heat to HRSG 142 via conduit 146. Subsequently, heat transfer apparatus 144 produces a cooled raw syngas stream that is channeled to a scrubber and low temperature gas cooling (LTGC) unit 221 via a syngas conduit 219. LTGC 221 removes particulate matter entrained within the raw syngas stream and facilitates the removal of the particulate matter via a fly ash conduit 222. LTGC 221 also provides cooling to the raw syngas stream.

Gasification system 200 also includes an acid gas removal subsystem 300 that is coupled in flow communication with LTGC 221. Subsystem 300 receives the cooled raw syngas stream via a raw syngas conduit 220. Moreover, acid gas removal subsystem 300 facilitates the removal of at least a portion of acid components from the raw syngas stream. In the exemplary embodiment, such acid gas components include, but are not limited to, $H_2S$ and $CO_2$. Acid gas removal subsystem 300 also facilitates the separation of at least some of the acid gas components into other components such as, but not limited to, $H_2S$ and $CO_2$. Acid gas removal subsystem 300 is coupled in flow communication with gasification reactor 208 via conduit 224. Conduit 224 channels the final integrated gas stream to predetermined portions of gasification reactor 208. The separation and removal of $CO_2$ and $H_2S$ via acid gas removal subsystem 300 produces a clean syngas stream that is channeled to gas turbine 114 via a clean syngas conduit 228.

Moreover, in the exemplary embodiment, acid gas removal subsystem 300 is coupled in flow communication with a compressor 400 via a conduit 334, such that at least a portion of the $H_2S$ and $CO_2$ stream is channeled via acid gas removal subsystem 300 to compressor 400. In one embodiment, compressor 400 is a compression system that includes at least one compression stage. Compressor 400 compresses the $H_2S$ and $CO_2$ stream to a predetermined pressure. In one embodiment, compressor 400 compresses the $H_2S$ and $CO_2$ stream to a supercritical pressure. In alternative embodiments, compressor 400 compresses the $H_2S$ and $CO_2$ stream to different predetermined pressure levels. Compressor 400 channels the compressed $H_2S$ and $CO_2$ streams to a sequestration system 500 such as, but not limited to, enhanced oil recovery and/or a saline aquifer.

During operation, air separation unit 202 receives air via conduit 204. The air is separated into $O_2$, $N_2$, and other components that are vented via a vent. The nitrogen is channeled to turbine 114 via conduit 206 and the oxygen is channeled to gasification reactor 208 via conduit 210. Also, in operation, coal grinding and preparation unit 211 receives coal and water via conduits 212 and 213, respectively, wherein the resulting coal slurry stream is channeled to gasification reactor 208 via conduit 214.

Gasification reactor 208 receives oxygen via conduit 210, coal via conduit 214, and the final integrated gas stream from acid gas removal subsystem 300 via conduit 224. Reactor 208 produces a hot raw syngas stream that is channeled to apparatus 144 via conduit 218. Any slag by-product formed in reactor 208 is removed via slag handling unit 215 and conduits 216 and 217. In an alternative embodiment, slag handling unit 215 recovers soot and recycles it to gasifier 208 through a conduit (not shown). Apparatus 144 cools the raw syngas stream to produce a cooled raw syngas stream that is channeled to scrubber and LTGC unit 221 via conduit 219. Within scrubber and LTGC 221, particulate matter is removed from the syngas via conduit 222 and the syngas is further cooled. The cooled raw syngas stream is channeled to acid gas removal subsystem 300 wherein acid gas components are substantially removed to form a clean syngas stream that may be channeled to gas turbine 114 via conduit 228.

Moreover, during operation, turbine 114 receives nitrogen and clean syngas via conduits 206 and 228, respectively. Turbine 114 combusts the syngas fuel, produces hot combustion gases, and channels the hot combustion gases to induce rotation of turbine 114.

At least a portion of the heat removed from the hot syngas via heat transfer apparatus 144 is channeled to HRSG 142 via conduit 146 wherein the heat facilitates the formation of steam. The steam is channeled to, and causes rotation of, steam turbine 132 via conduit 150. Turbine 132 rotates second generator 134 via second rotor 136.

Figure 2:
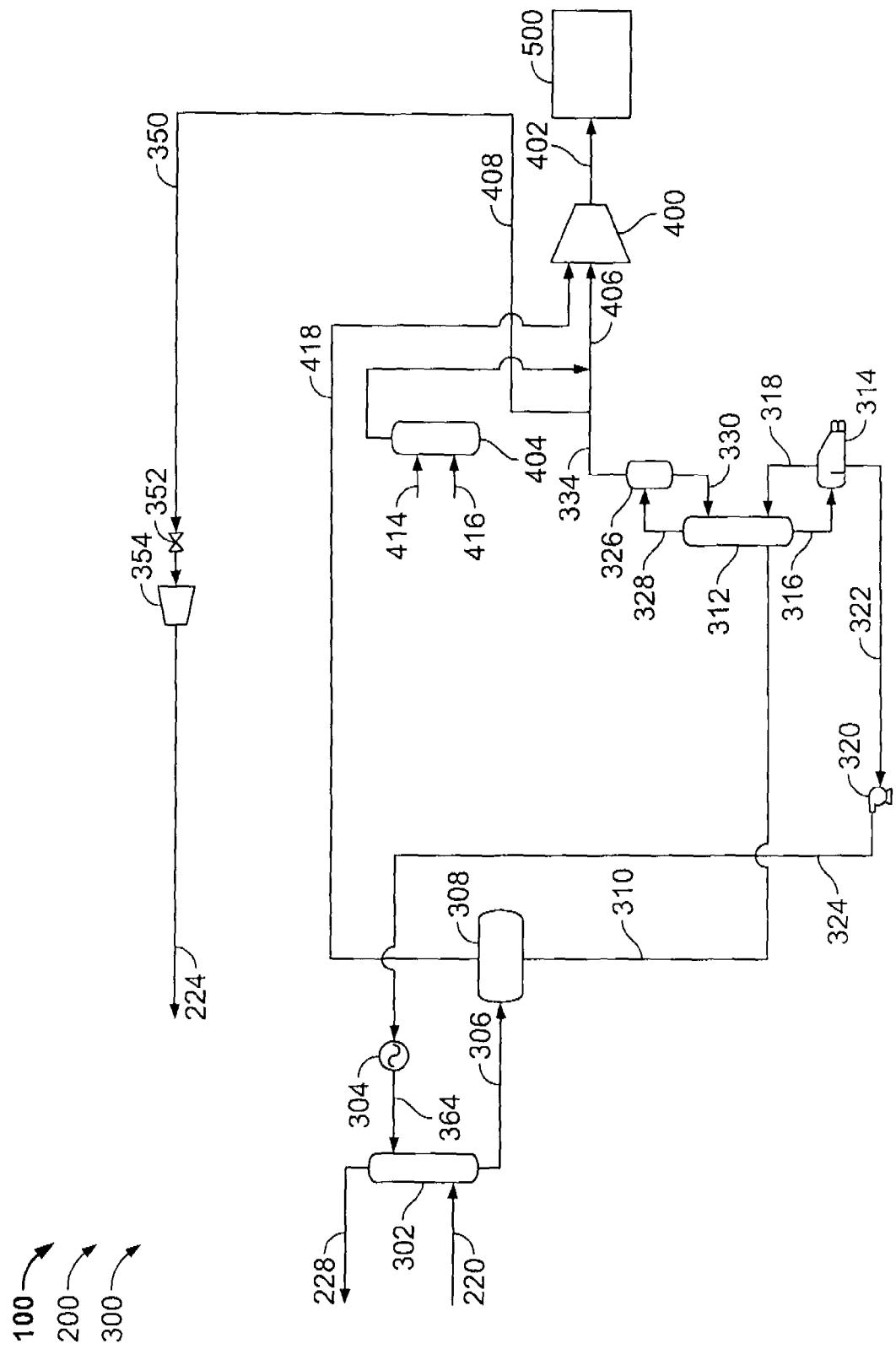
FIG. 2 is a schematic of an exemplary acid gas removal subsystem that can be used with the IGCC power generation system shown in FIG. 1.

FIG. 2 is a schematic diagram of an exemplary acid gas removal subsystem 300 that may be used with an IGCC power generation system, such as plant 100 (shown in FIG. 1). Acid gas removal subsystem 300 receives the raw stream via conduit 220. Also, acid gas removal subsystem 300 channels the clean syngas stream to turbine 114 via conduit 228. In addition, acid gas removal subsystem 300 channels the integrated gas stream to a gasification reactor, such as gasification reactor 208 (shown in FIG. 1) via conduit 224. Conduit 220 is coupled in flow communication to at least one high pressure absorber 302. In the exemplary embodiment, acid gas removal subsystem 300 includes one or more high pressure absorbers 302 that are coupled in flow communication with conduit 220. Alternatively, acid gas removal subsystem 300 may include any number of high pressure absorbers 302 that facilitates operation of subsystem 300 as described herein.

In the exemplary embodiment, main absorber 302 uses a solvent to facilitate acid gas removal from the raw syngas stream. The raw syngas stream contacts at least a portion of an acid gas-lean solvent, which removes at least a portion of the selected acid gas components from the raw syngas stream to produce the clean syngas stream. The removed acid gas components are retained within the solvent such that a first acidgas rich, or simply rich, solvent stream is formed. In the exemplary embodiment, such acid gas components include, but are not limited to only including, $H_2S$ and $CO_2$. Alternatively, any components may be removed that facilitates operation of IGCC system 100 as described herein.

In the exemplary embodiment, high pressure absorber 302 is coupled in flow communication with a flash drum 308 via first rich solvent stream conduit 306. Alternatively, high pressure absorber 302 may be coupled in flow communication with any number of flash drums 308 that facilitate the operation of acid gas removal subsystem 300 as described herein.

Flash drum 308 forms a flash gas and a second rich solvent stream that includes at least some remaining $CO_2$ and $H_2S$ gaseous components that were not removed by the flashing mechanism described above. As such, in the exemplary embodiment, flash drum 308 is also coupled in flow communication with at least one acid gas stripper 312 via a second rich solvent conduit 310 that channels at least a portion of the second rich solvent stream to acid gas stripper 312. Alternatively, a plurality of flash drums 308 may be coupled in flow communication to each other in a series or a parallel configuration, wherein the plurality of flash drums 308 are coupled in flow communication with acid gas stripper 312 via any number of conduits that facilitate the operation of acid gas removal subsystem 300 as described herein. Moreover, in the exemplary embodiment, flash drum 308 is also coupled in flow communication with compressor 400 via conduit 418. As such, flash drum 308 channels at least a portion of the flash gas to compressor 400.

Acid gas stripper 312 receives a rich solvent stream channeled by conduit 310. Acid gas stripper 312 regenerates the received rich solvent to a lean solvent by substantially reducing the concentration of any acid gas components within the rich solvent, thereby forming a lean solvent stream that is substantially free of $CO_2$ and $H_2S$. Acid gas stripper 312 is coupled in flow communication with a reboiler 314 via a conduit 316, wherein the lean solvent stream is channeled to reboiler 314. Reboiler 314 heats the lean solvent and is coupled in flow communication with acid gas stripper 312. A portion of the heated lean solvent is channeled to acid gas stripper 312 via a conduit 318, to facilitate a vapor boilup within acid gas stripper 312 such that stripper performance is facilitated to be improved.

Reboiler 314 is also coupled in flow communication with at least one heat transfer apparatus 304 via pump 320 and conduits 322 and 324. Pump 320 and conduits 322 and 324 channel the hot lean solvent stream through heat transfer apparatus 304. Heat transfer apparatus 304 facilitates a transfer of heat from the hot lean solvent stream to the first rich solvent stream. Heat transfer apparatus 304 is coupled in flow communication with high pressure absorber 302 via conduit 364. Conduit 364 channels a warm lean solvent stream from heat transfer apparatus 304 and facilitates the removal of at least some of the heat within the warm solvent stream to form a cooler, lean solvent stream.

Acid gas stripper 312 produces a first $CO_2/H_2S$ acid gas stream as a function of regenerating the solvent as described above. Acid gas stripper 312 is coupled in flow communication with a phase separator 326 via a conduit 328. The first $CO_2/H_2S$ acid gas stream may contain solvent. Phase separator 326 facilitates removing solvent from the first $CO_2/H_2S$ acid gas stream and then returns the solvent back to acid gas stripper 312 via conduit 330. More specifically, phase separator 326 forms a second $CO_2/H_2S$ acid gas stream. Thereafter, the second $CO_2/H_2S$ acid gas stream is channeled to compressor 400 via conduit 406.

In the exemplary embodiment, condensate from the bottom of gasifier 208 is channeled to an ammonia stripper 404 via conduit 414. Additionally, condensate from LTGC 221 is channeled to ammonia stripper 404 via conduit 416. Ammonia stripper 404 forms an ammonia-rich overhead, and channels the overhead to compressor 400 via conduit 406.

In one embodiment, compressor 400 is a compression system including at least one compression stage. The second $CO_2/H_2S$ acid gas stream, the ammonia-rich overhead stream, and the flash gas are compressed to a predetermined pressure by compressor 400. In one embodiment, compressor 400 compresses the second $CO_2/H_2S$ acid gas stream and ammonia-rich overhead stream are compressed to a supercritical pressure. In alternative embodiment, compressor 400 compresses the second $CO_2/H_2S$ acid gas stream and ammonia-rich overhead stream are compressed to a different predetermined pressure. Compressor 400 is also coupled in flow communication with a storage system 500 via a conduit 402. The compressed streams are channeled to storage system 500. In the exemplary embodiment, storage system 500 is one of a saline aquifer and an enhanced oil recovery field. Moreover, phase separator 326 is coupled in flow communication with at least one compressor 354 via at least one conduit 350 and at least one blocking valve 352. Compressor 354 is also coupled in flow communication with conduit 224.

In the exemplary embodiment, valve 352 is remotely and automatically operated and are electrically coupled with a control system (not shown). Alternatively, valve 352 may be operated in any manner that facilitates operation of acid gas removal subsystem 300 as described herein.

During operation, acid gas removal subsystem 300 operates to remove at least a portion of acid components from the raw syngas stream. Such acid gas components include, but are not limited to only including, $H_2S$ and $CO_2$. Subsystem 300 further facilitates the separation of at least some of the acid gas components into components that include, but are not limited to, $H_2S$ and $CO_2$. Specifically, the first CO2/H2S acid gas stream from the acid gas stripper 312 is channeled to phase separator 326 via conduit 328. Phase separator 326 produces a second $CO_2/H_2S$ acid gas stream acid gas stream that has a higher concentration of $CO_2$ than the first $CO_2/H_2S$ acid gas stream. The second $CO_2/H_2S$ acid gas stream is channeled to compressor 400 via conduit 406. An ammonia-rich overhead stream is also channeled to compressor 400 via conduit 406, from ammonia stripper 404. Further, a flash gas stream is channeled to compressor 400 via conduit 418, from flash drum 308. Compressor 400 compresses the second $CO_2/H_2S$ acid gas stream, ammonia-rich overhead stream, and flash gas stream to a predetermined pressure and channels the compressed streams to storage system 500 via conduit 402.

Figure 3:
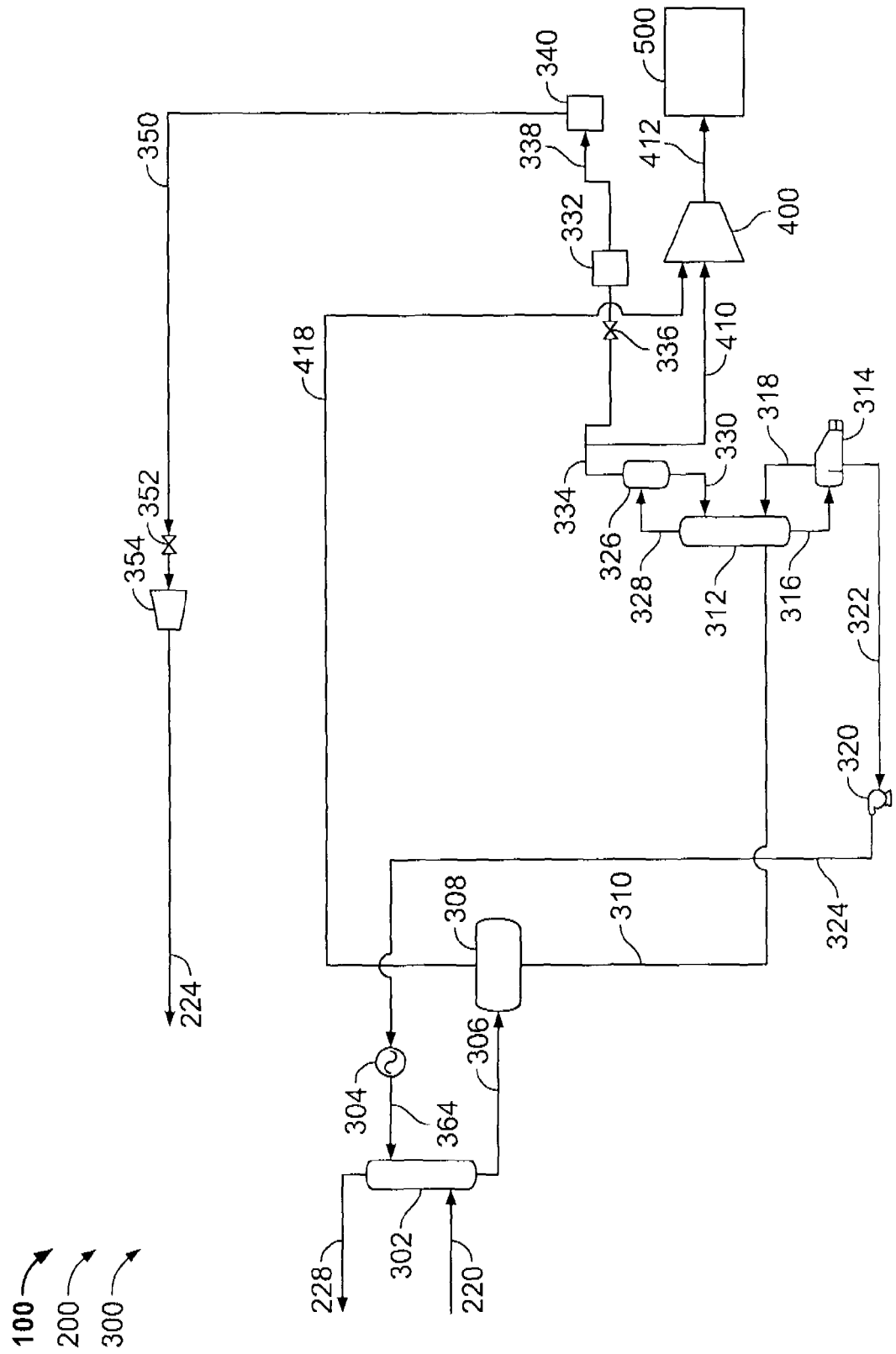
FIG. 3 is a schematic of an alternative acid gas removal subsystem that can be used with the IGCC power generation system shown in FIG. 1.

FIG. 3 is a schematic diagram of an alternative embodiment of acid gas removal subsystem 300. In such an embodiment, acid gas removal subsystem 300 includes at least one chemical transition unit, or sulfur removal unit (SRU) 332, that is coupled in flow communication with phase separator 326 via at least one conduit 334 and at least one inlet block valve 336. SRU 332 receives a portion of the second $CO_2/H_2S$ acid gas stream, and forms sulfur dioxide ($SO_2$) and elemental sulfur (S). Specifically, a portion of the $H_2S$ within the second $CO_2/H_2S$ acid gas stream reacts with $O_2$ to form $SO_2$. The $SO_2$ also reacts with the remaining $H_2S$ to form elemental S and $H_2O$. Unconverted $CO_2$, $SO_2$, and $N_2$ within SRU 332 form an SRU tail gas stream. Any sulfur (S) formed is removed from SRU 332 via a conduit 338. In the exemplary embodiment, phase separator 326 is also coupled in flow communication with compressor 400 via a conduit 410. Additionally, flash drum 308 is coupled in flow communication with compressor 400 via conduit 418. In one embodiment, compressor 400 is a compression system including at least one compression stage. The second $CO_2/H_2S$ acid gas stream from phase separator 326 and a flash gas stream from flash drum 308 are compressed to a predetermined pressure by compressor 400. In one embodiment, compressor 400 compresses the second $CO_2/H_2S$ acid gas stream and the flash gas stream to a supercritical pressure. Compressor 400 is also coupled in flow communication with storage system 500 via a conduit 412. The compressed second $CO_2/H_2S$ acid gas stream and flash gas stream are channeled to storage system 500. In the exemplary embodiment, storage system 500 is one of a saline aquifer and an enhanced oil recovery field.

Sulfur removal unit 332 is coupled in flow communication with at least one chemical transition unit, or tail gas unit (TGU) 340, that receives the SRU tail gas stream via a conduit 338. Tail gas unit 340 also forms $H_2S$ by hydrogenating the unconverted $SO_2$ with hydrogen ($H_2$). Carbon dioxide within the second $CO_2/H_2S$ acid gas stream and the SRU tail gas stream are substantially chemically unchanged.

In the alternative embodiment, acid gas removal subsystem 300 also includes at least one compressor 354 coupled in flow communication with TGU 340 via at least one conduit 350 and at least one blocking valve 352. Compressor 354 is also coupled in flow communication with conduit 224.

In the alternative embodiment, valves 336 and 352 are remotely and automatically operated and are electrically coupled with a control system (not shown). Alternatively, valves 336 and 352 may be operated in any manner that facilitates operation of acid gas removal subsystem 300 as described herein.

During operation, acid gas removal subsystem 300 operates to remove at least a portion of acid components from the raw syngas stream. Such acid gas components include, but are not limited to, $H_2S$ and $CO_2$. Subsystem 300 further facilitates the separation of at least some of the acid gas components into components that include, but are not limited to, $H_2S$ and $CO_2$. Specifically, the first $CO_2/H_2S$ acid gas stream from the acid gas stripper 312 is channeled to phase separator 326 via conduit 328. Phase separator 326 produces a second $CO_2/H_2S$ acid gas stream acid gas stream that has a higher concentration of $CO_2$ than the first $CO_2/H_2S$ acid gas stream. A first portion of second $CO_2/H_2S$ acid gas stream is channeled to compressor 400 via conduit 410. Moreover, a flash gas stream is channeled via conduit 418 to compressor 400, from flash drum 308. Compressor 400 compresses the portion of the second $CO_2/H_2S$ acid gas stream and the flash gas stream to a predetermined pressure and channels the compressed streams to storage system 500 via conduit 402. A second portion of second $CO_2/H_2S$ acid gas stream is channeled from phase separator 326 to SRU 332 via conduit 334 and valve 336. Sulfur recovery unit 332 removes at least a portion of sulfur from the second $CO_2/H_2S$ acid gas stream. Tail gas from SRU 332 is channeled to TGU 340 via conduit 338. Tail gas unit 340 removes at least a portion of the remaining sulfur from SRU tail gas. TGU tail gas is recycled to gasification system 100 via blower 34 and compressor 354.

The above-described systems and methods facilitate eliminating the complexity of gasification plants using $CO_2$ capture, and by eliminating the need for, in one embodiment, expensive equipment such as sulfur recovery units and tail gas units. Additionally, the systems and methods facilitate creating an alternative low-cost solution for sequestration of rich $CO_2$.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of a $CO_2$ capture system for an integrated gasification combined-cycle (IGCC) power system, it is understood that the apparatus and methods are not limited to $CO_2$ capture systems or IGCCs. Likewise, the system components illustrated are not limited to the specific embodiments herein, but rather, components of the system can be utilized independently and separately from other components described herein.

While the invention has been described in terms of various specific embodiments, those skilled in the art will recognize that the invention can be practiced with modification within the spirit and scope of the claims.

What is claimed is:

1. A method for sequestering an emissions-heavy gas, said method comprising:
   channeling a rich solvent through a flash drum to form a flash gas;
   channeling the rich solvent from the flash drum to an acid gas stripper;
   removing at least a portion of an acid gas from the rich solvent in the acid gas stripper to create the emissions-heavy gas;
   channeling the flash gas to a storage system;
   channeling a first condensate from a gasifier bottom to an ammonia stripper;
   removing at least a portion of ammonia from the first condensate to create an overhead gas;
   mixing the emissions-heavy gas with the overhead gas formed in the ammonia stripper; and
   channeling the mixed gases to the storage system.

2. A method in accordance with claim 1 further comprising:
   channeling at least a portion of a raw syngas to an acid gas absorber;
   removing at least a portion of sulfur from the syngas to create the rich solvent; and
   channeling at least a portion of the rich solvent to the acid gas stripper.

3. A method in accordance with claim 1 further comprising channeling at least a portion of the flash gas to a compressor.

4. A method in accordance with claim 1 further comprising:
   channeling a second condensate from a low temperature gas cooling unit to the ammonia stripper; and
   removing at least a portion of ammonia from the second condensate to create the overhead gas.

5. A method in accordance with claim 1 further comprising channeling the emissions-heavy gas to a compressor.

6. A method in accordance with claim 5 wherein channeling the emissions-heavy gas to the storage system further comprises pressurizing the emissions-heavy gas to a predetermined pressure.

7. A method in accordance with claim 1 further comprising:
   channeling a first portion of the emissions-heavy gas from the acid gas stripper to a sulfur removal unit;
   removing at least a portion of sulfur from the first portion in the sulfur removal unit;
   channeling a second portion of the emissions-heavy gas to a compressor; and
   pressurizing the second portion of the emissions-heavy gas to a predetermined pressure.

8. A method for removing carbon dioxide ($CO_2$) from gases produced by a power system, said method comprising:
- channeling a rich solvent through a flash drum to create a flash gas;
- channeling the rich solvent to an acid gas stripper;
- removing at least a portion of an acid gas from the rich solvent in the acid gas stripper to create a $CO_2$ stream;
- channeling a first condensate from a gasifier to an ammonia stripper;
- removing at least a portion of ammonia from the first condensate to create an overhead gas;
- combining the $CO_2$ stream with the overhead gas;
- pressurizing at least a portion of the combined gases and the flash gas; and
- channeling the pressurized combined gases and the pressurized flash gas to one of a saline aquifer and an enhanced oil recovery field.

9. A method in accordance with claim 8 wherein removing at least a portion of an acid gas from the rich solvent further comprises:
- channeling at least a portion of a raw syngas to an acid gas absorber;
- removing at least a portion of sulfur from the syngas to create the rich solvent; and
- channeling at least a portion of the rich solvent to the acid gas stripper.

10. A method in accordance with claim 8 further comprising channeling at least a portion of the flash gas to a compressor.

11. A method in accordance with claim 8 further comprising:
- channeling a second condensate from a low temperature gas cooling unit to the ammonia stripper;
- removing at least a portion of ammonia from the second condensate to create the overhead gas.

12. A method in accordance with claim 8 wherein pressurizing the $CO_2$ stream further comprises channeling the $CO_2$ stream to a compression system including at least one compression stage.

13. A method in accordance with claim 8 wherein pressurizing the $CO_2$ stream further comprises pressurizing the $CO_2$ stream to a predetermined pressure.

14. A method in accordance with claim 8 further comprising:
- channeling a first portion of the $CO_2$ stream from the acid gas stripper to a sulfur removal unit;
- removing at least a portion of sulfur from the first portion of the $CO_2$ stream in the sulfur removal unit;
- channeling a second portion of the $CO_2$ stream to a compressor; and
- pressurizing the second portion of the $CO_2$ stream to a predetermined pressure.

15. A gas treatment system for use with a power system, said gas treatment system comprising:
- a flash drum configured to form a rich solvent and a flash gas;
- an acid gas stripper coupled in flow communication with said flash drum to receive the rich solvent discharged from said flash drum, said acid gas stripper configured to remove at least a portion of an acid gas from the rich solvent to create a carbon dioxide ($CO_2$) stream;
- an ammonia stripper coupled in flow communication downstream from a gasifier, said ammonia stripper is configured to:
  - remove at least a portion of ammonia from a first condensate received from said gasifier to create an overhead gas; and
  - mix the overhead gas with the $CO_2$ stream;
- a compressor coupled in flow communication downstream from said acid gas stripper, downstream from said ammonia stripper, and downstream from said flash drum, said compressor configured to pressurize the mixed gases and the flash gas; and
- a $CO_2$ sequestration system coupled in flow communication downstream from said compressor, said compressor further configured to channel at least a portion of the pressurized mixed gases and at least a portion of the pressurized flash gas to said $CO_2$ sequestration system.

16. A gas treatment system in accordance with claim 15 further comprising an acid gas absorber configured to remove at least a portion of sulfur from a syngas to create the rich solvent, said acid gas stripper is coupled in flow communication downstream from said acid gas absorber.

17. A gas treatment system in accordance with claim 15, wherein said ammonia stripper is coupled in flow communication downstream from a low temperature gas chilling unit, said ammonia stripper is configured to remove at least a portion of ammonia from a second condensate received from said low temperature gas chilling unit to create the overhead gas.

18. A gas treatment system in accordance with claim 15 wherein said compressor comprises a compression system comprising at least one compression stage, wherein said compression system is configured to pressurize at least a portion of the $CO_2$ stream to a predetermined pressure.

19. A gas treatment system in accordance with claim 15 wherein said acid gas stripper is configured to channel a first portion of the $CO_2$ stream to a sulfur removal unit coupled in flow communication downstream from said acid gas stripper, said sulfur removal unit is configured to remove at least a portion of sulfur from the first portion of the $CO_2$ stream, said acid gas stripper further configured to channel a second portion of the $CO_2$ stream to said compressor.

20. A gas treatment system in accordance with claim 15 wherein said $CO_2$ sequestration system comprises one of a saline aquifer and an enhanced oil recovery field.

* * * * *